United States Patent [19]

Rubio et al.

[11] Patent Number: 4,620,826
[45] Date of Patent: Nov. 4, 1986

[54] MATERIALS HANDLING APPARATUS

[75] Inventors: Manuel J. Rubio, Bridgeport, Conn.; Alberto de la Vega, Garcia, Mexico

[73] Assignee: Roberto Gonzales Barrera, Monterrey, Mexico

[21] Appl. No.: 585,608

[22] Filed: Mar. 2, 1984

[51] Int. Cl.$^4$ .............................................. B65G 57/03
[52] U.S. Cl. ..................................... 414/73; 198/811; 198/803.5; 198/422; 198/955; 251/357; 271/197; 271/218; 414/45; 414/49; 414/50; 414/100
[58] Field of Search ............... 414/73, 43, 45, 48, 414/49, 50, 72, 97, 98, 100; 198/422, 645, 678, 689, 811, 955; 271/283, 292, 294, 194, 197, 217, 218, 176; 251/357

[56] References Cited

U.S. PATENT DOCUMENTS

| | | | |
|---|---|---|---|
| 3,477,558 | 11/1969 | Fleischauer | 271/197 X |
| 3,971,481 | 7/1976 | Longenecker et al. | 414/50 X |
| 4,157,177 | 6/1979 | Strecker | 414/73 X |
| 4,379,663 | 4/1983 | Allison | 406/28 X |
| 4,474,367 | 10/1984 | Jongerling et al. | 271/197 |

Primary Examiner—Frank E. Werner
Attorney, Agent, or Firm—William G. Rhines

[57] ABSTRACT

This invention relates to apparatus for transporting articles from one location to another by use of vacuum to suspend them from the underside of a perforated conveyor belt as it moves along the apertured underside of a vacuum box. Embodiments include a vertically actuable flat plate having a compressible bottom surface positioned within the box, whereby upon actuation of the plate downwards, vacuum acting through the apertures of the underside of the vacuum box may be interrupted and a slight positive pressure introduced into the apertures, to effectuate release of suspended articles.

6 Claims, 3 Drawing Figures

U.S. Patent  Nov. 4, 1986  Sheet 1 of 2  4,620,826
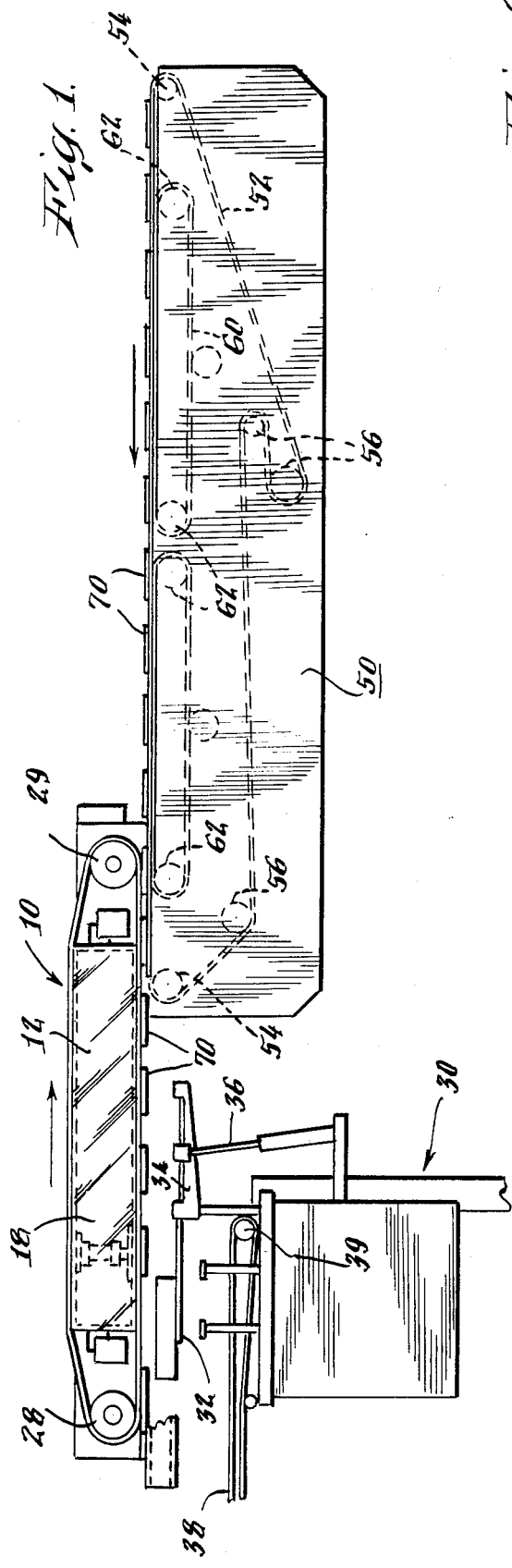
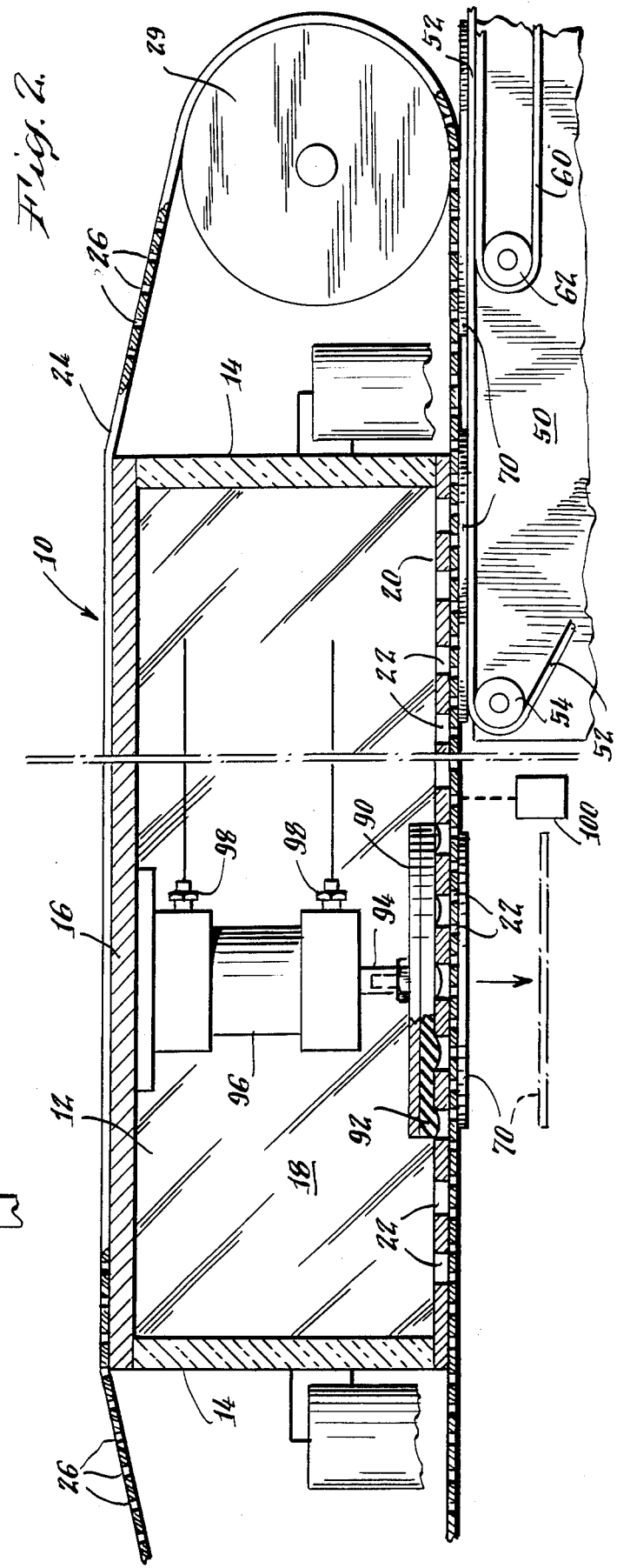

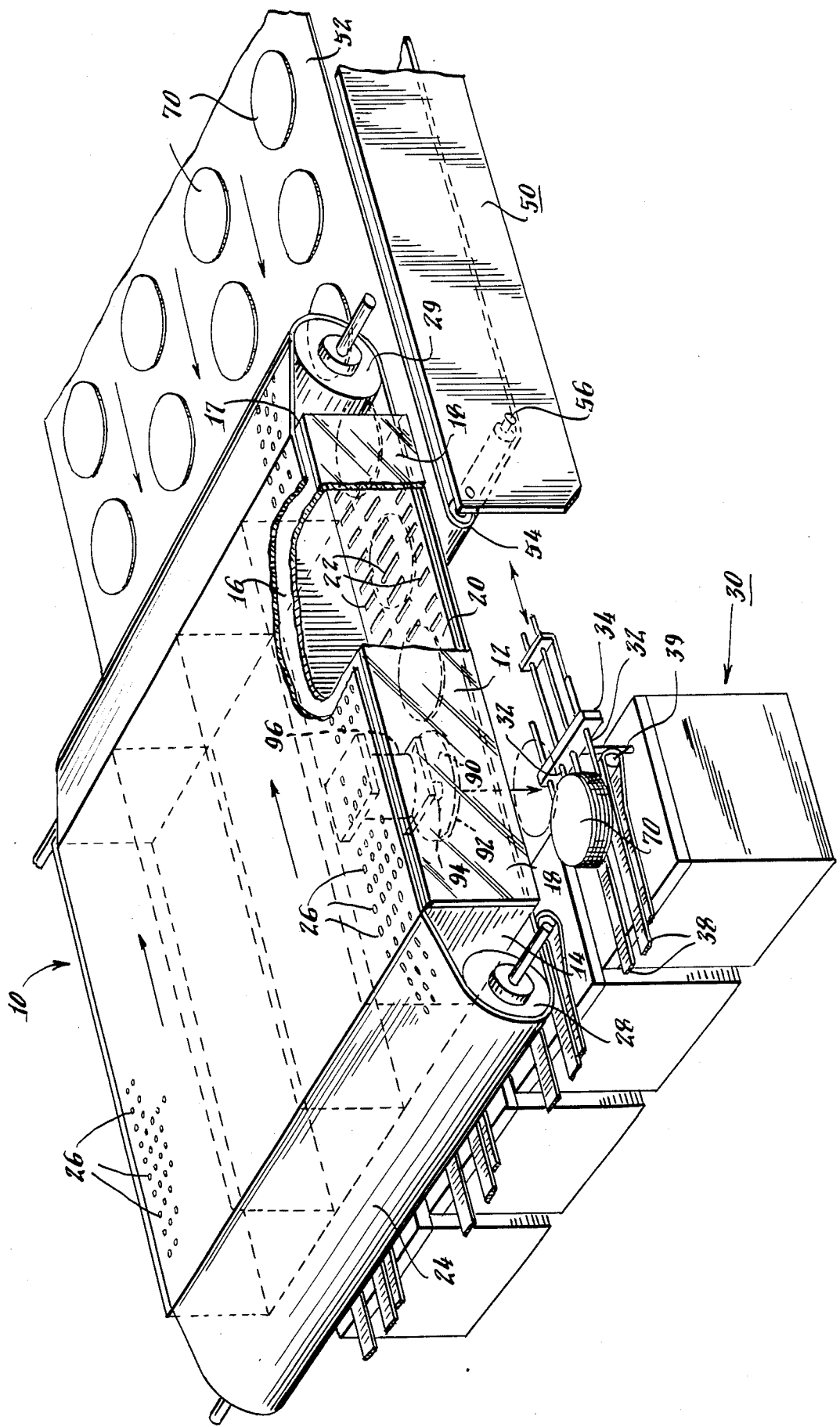

MATERIALS HANDLING APPARATUS

BACKGROUND OF INVENTION

In the field of materials handling, it is frequently desired to transport articles from one location to another. One method of doing so that is particularly adapted to handling articles which are flexible, limber or otherwise difficult or impossible to grasp is to pick them up by means of vacuum. Typically, such devices include a vacuum box having an apertured bottom about which an endless, foraminous belt moves by means of drive rolls and idler rolls. By this means, articles that have been moved into position beneath the vacuum box will become suspended from the underside of the conveyor belt, by which they may be moved from one location to another. Thus, for example, it may be desired to transport tortillas after they have been cooked and cooled, from the top of a moving conveyor belt to stacking apparatus in which piles of tortillas are accumulated for packaging and/or further processing. Particular problems with tortillas are that the distribution of the material comprising each tortilla typically is markedly uneven as between different regions of the same tortilla, and each tortilla tends to differ significantly in its weight as between tortillas. These characteristics tend to exaggerate the undesirable effects which occur when vacuum transfer mechanisms are used of the types heretofor known.

Such prior art apparatus typically has included a variety of means for disassociating the articles being carried from the vacuum-implemented conveyor belts from which they are suspended and are being moved. Scraper blades have proven inadequate because they cause the leading edge of the tortilla to start to fall first, resulting frequently in the tortilla being folded under, or wrinkled when it comes to rest on the surface to which it falls. Prior art efforts to interrupt the vacuum as a means to achieve release of the product have also proved unsatisfactory, particularly as production speeds have increased. One proposal was to simply eliminate periodically the vacuum in the vacuum box. This is a costly and time consuming approach because of the necessity for repeatedly re-establishing the vacuum within the box. Further, the effective distance of conveyance is severely limited by reasonable production volumes since, without more, other articles suspended on the belt of such apparatus will drop simultaneously with the one desired to be released. Neither has it proved feasible, in an attempt to circumvent these difficulties, to achieve release by having the articles move past the vacuum box section into a region of no vacuum or positive pressure. That is because each article as it is moved along is released progressively from front toward back, rather than simultaneously throughout, so that, just as with a scraper blade, the front edge tends to fold under, the tortilla tends to land wrinkled, etc. Further, unless positive pressure is introduced to overcome the vacuum in each aperture of the belt, the presence of the tortilla and the sealing effect on it of the vacuum previously introduced into each aperture tends to cause the vacuum to linger for a while at least. The rate of decay of the vacuum will then vary according to a number of factors, such as how effective the seal is between the bottom of the belt and each tortilla. This coupled with the significant irregularity of weight as between tortillas means that the lapsed time period following interruption of the vacuum before release will occur may vary widely. With the belt moving at the comparatively high and sustained linear speeds that are highly desired in the interests of high production volumes and efficiencies, the tortillas drop at widely distributed locations along the path of travel, making such desired results as orderly, straight stacking impossible.

It has also been proposed to position a flat plate having apertures corresponding to those of the bottom of the vacuum box immediately above the bottom in contacting sliding relation thereto. When vacuum is desired through the belt, the plate is positioned so that its apertures are aligned with those of the box bottom. Sliding the plate laterally may then cause the rapid and simultaneous shutting off of a multiplicity of the box bottom holes. Even this, however, has not proved satisfactory because of the problem of residual vacuum in the carrier belt apertures, with consequent unsatisfactory stacking as described above, and because of the great leakage between the plate and the box bottom which higher vacuums will induce.

Accordingly, it is an object of this invention to provide means for releasing satisfactorily objects being transported by a vacuum box conveyor.

Another object of this invention is to provide such means adapted particularly for the release of flexible articles being so conveyed.

Still another object of this invention is to provide means by which objects transported by a vacuum conveyor may be automatically and accurately stacked.

SUMMARY OF INVENTION

Desired objectives may be achieved through practice of this invention which comprises means to release articles being transported by a vacuum conveyor that has a vacuum box with an apertured bottom and an associated moving apertured conveyor belt to the underside of which, by means of vacuum transmitted on such objects from the box through the belt, such objects are suspended. The release means comprises a flat plate which is positioned in parallel planar relationship to the top surface of mid bottom of said box, has a compressible bottom surface which, by vertical motion of the plate, is moveable between contacting and closely spaced-apart positions with respect to said surface of said box bottom. Other embodiments include a receiver for objects released from such a conveyor that may be lowered in sequential steps, each of which is the same in vertical distance as the height of each object being dropped on to it, whereby the vertical drop distance of articles released from said conveyor to the receiver or objects previously accumulated thereon (as the case may be) will remain substantially constant.

DESCRIPTION OF DRAWINGS

This invention may be understood from the description which follows and from the accompanying drawings in which FIG. 1 is a cross-sectional view of an embodiment of this invention, FIG. 2 is a cross-sectional view of a portion of the embodiment shown in FIG. 1, and FIG. 3 is a perspective view of the embodiment of this invention shown in FIGS. 1 and 2.

DESCRIPTION OF PREFERRED EMBODIMENTS

Referring first to FIG. 1, there is depicted a cross-section of an embodiment of this invention comprising a transfer mechanism 10 with an associated stacker mechanism 30 and conveyor mechanism 50. Reference is also made to FIG. 2 which is an enlarged cross-section of a portion of the transfer mechanism 10, and to FIG. 3 which is a perspective view of the transfer mechanism 10 and portions of the stacker mechanism 30 and the transfer mechanism 50. The transfer mechanism 50 is of known per se design. It includes an endless conveyor belt 52 made from rubber, plastic, stainless steel, open mesh metal, plastic screening, or other suitable known per se material, moveably positioned about support rolls 54 and kept taut by means of tension rolls 56. The conveyor belt may be driven by means of one or more drive belts 60 which are positioned about drive rolls 62, by one or more electric motors or other known per se drive means (not shown). By means of this type of mechanism, products such as tortillas 70, which have been delivered to the conveyor mechanism 50 from forming, oven and/or cooling means (not shown) may be transported with desired spacing as between adjacent products, toward the stacker 30.

The stacker 30 may be of any of a variety of structures and configurations. The one herein depicted is particularly useful for stacking piles of products such as tortillas which characteristically tend to be limber and difficult to handle and align. To that end, the stacker shown in FIGS. 1 and 3 comprises parallel tines 32 supported by a support 34 which, in turn may be elevated (along with the tines 32) at progressively lower selected positions, corresponding to the thickness of the products 70, by means of a hydraulic, pneumatic or mechanical elevator mechanism 36. Associated conveyor belts 38 which are spaced apart from each other to provide spaces therebetween through which the tines 32 may freely pass as they are lowered by operation of the elevator mechanism 36 and are driven by drive means (not shown) about idler rolls 39. In operation, the tines receive the first in each stack of products being made, ratcheting downward in progressive steps, one step the thickness of each tortilla received. When about 50% of the total number of products in each stack have thereby been received by the tines, the tines will have progressed downward to the point where the undersurface of the bottom-most tortilla is resting on the top of the conveyor belts 38. The idler rolls 39 are supported by an axle and support mechanism which also ratchets downward thus lowering the stack supporting end of the conveyor belt 38, in the same successive steps of one tortilla thickness each. Thus, each tortilla as it drops from the transfer mechanism 10 to the stacker mechanism 30 "sees" a receiving surface (of the next previously deposited tortilla, or the tines if it is the first tortilla in the stack) that is substantially the same distance below it as are all of the other products in the stack. This enhances straight stacks being consistently produced since all of the products upon release from the transfer mechanism, for a given product size and transfer speed, have substantially the same trajectory. Thus, interruption of each drop after about the same vertical distance of fall ensures that the lateral displacement of each product is substantially the same as all of the others. There is provided means for removing stacks of products each having the desired number of component products, by actuation of the conveyor belts 38 from the region of the stacker, so that the stacks of products may be further processed as by being wrapped, placed in cartons for shipment, etc. When a stack accumulated on the tines has been so transferred to the conveyor belts 38 as described above, sensing means such as a photocell, a proximity switch, or a micro switch (not shown) may sense that that has occurred, causing the tines to be withdrawn and then elevated into position to begin receiving the first of the products that will constitute the next stack when a full stack has accumulated on and is being carried away by the conveyor belts 38.

The transfer mechanism 10 is so structured and operable as to permit products such as tortillas being moved along by the conveyor means 50, to be removed therefrom and carried over to apparatus such as the stacker 30, there to be accurately placed, one atop the other, in orderly, straight stacks in which the constituent products are not folded over or substantially offcenter with respect to each other. As shown, the transfer mechanism comprises a vacuum chamber 12 dsecribed by end walls 14, a top wall 16, side walls 18, and a bottom 20 having perforations 22 which may be round or of generally elongated configuration with their long axes oriented in the cross-machine direction. Advantageously, there may be a greater number of holes in the region of the bottom 22 that is first passed by tortillas since this provides more vacuum in order to effect initial transfer of products to carrier belt 24, following which less vacuum is needed to hold the tortillas on the belt. An associated carrier belt 24 which may be woven, or a belt of sheet-like material having a multiplicity of perforations 26, preferably of round configuration, is moveably positioned about drive rolls 28, 29 by which the belt 24 may be caused to move about the vacuum chamber 12. Belts having a multiplicity of round holes have been found advantageous for use in this application because they are widely used in other industries such as papermaking, and so are readily available and comparatively inexpensive. It has also been found advantageous to use belts having a great number of small holes, since, as will be apparent from what follows, this tends to distribute the vacuum more evenly and over smaller increments of surface area of the belt. Positioned within the vacuum chamber 12 is a stop plate 90, preferably having a lower sealer section 92 made from rubber or other resilient gasket material that may be selectively actuated by piston 96 of hydraulic, pneumatic, or other fluid nature, or a solenoid connected by means 98 to known per se actuating means therefore (not shown). Although here shown as being positioned within the vacuum chamber 12, space within the chamber 12 may be saved by positioning the stop plate actuation and control mechanisms outside the box, connected to the stop plate by a connecting rod or other motion transfer means moveably positioned through a gasketed opening in the top or other walls of the chamber 12. Associated with the transfer means 10 is means for sensing the pressure or absence of an article 70 positioned on the lower surface of the carrier belt 24. As shown in FIG. 2 particularly, the sensor means is in the form of any known per se sensor design, such as a photocell 100 which is directed upward toward the carrier belt 24, so that its light beam 102 may be utilized to detect the presence or absence of a product on the belt, all according to known per se means, methods, and apparatus. In a preferred embodiment, the sensor means is so positioned, as in the vacuum box itself, that it is not in danger of being blocked from detecting because of products falling on it.

In operation, a multiplicity of products 70 is moved along by conveyor belt 52 away from the associated forming apparatus, cooler, and/or oven means in the direction shown to a point where the products 70 are overlaid by carrier belt 24. As the overlay thus formed moves each product 70 past the end 14 of the vacuum box 12, the perforations 22 in the box bottom 20, acting through the perforations 26 of the carrier belt 24, cause each product to be adhered, by the negative pressure or vacuum transferred thereby, to the underside of the carrier belt 24, because of which products may be carried along through the distance from the conveyor means 50 to the region of the stacks 10. As a product in a given line of products passes the sensor, such as the light beam 10 of the photocell 100, the piston 96 is armed for movement of the stop plate 90 downward. At a pre-determined time after the photocell 100 detects that a product 70 has passed its beam 102, the piston 96 is actuated to cause the plate 90 to move downward. Through the sealing effect on the bottom plate holes 22 of the gasket 92, the vacuum induced on the product 70 by the vacuum box 12 is broken. At the same time, a slight positive pressure is introduced to the top surface of the product 70 by virtue of the piston effect of the gasket 92 acting downward into the top of the holes 22 in the bottom plate 22. The cumulative effect of these two simultaneous actions is to cause each product in each row of products to be released almost precisely at the same point in path of transit, and virtually simultaneously throughout its entire lateral expanse. By this means, and the previously described uniform control of the distance over which all of the products fall before landing on the stack, products are able to be stacked with great precision, one on top of the other, without any appreciable folding over or wrinkling due to some portions of any one being released before other portions. Apparatus utilizing the principles of this invention have been operated successfully in parallel production lines to transfer and stack standard tortillas having a weight of 34 grams each, of 0.030"–0.080" thickness, and 6"–14" diameter, into 7-12 oz. stacks of one dozen each, at a speed of 150 tortillas per row per minute.

From the foregoing, it will be seen that using apparatus according to this invention, it is possible to achieve satisfactory release of products such as tortillas from vacuum conveyor belts traveling at high speeds, that is adapted for automated stacking because each product is released at all points throughout simultaneously and is in an entirely flat attitude upon release. When combined with a "step-action" receiver of the type described as part of an associated stacker, whereby each moving article upon release "sees" the same distance to fall vertically and therefore, by the trajectory of all articles released being substantially the same, exhibit a lateral displacement substantially equal to that of all the others in a given stack, the result is realization of such automated stacking with assurance that the stacks of articles so produced will be straight up and down.

It is to be understood that the embodiments of this invention herein disclosed, described, and illustrated are by way of illustration and not of limitation, and that a wide variety of embodiments may be made without departing from the spirit and scope of this invention.

We claim:

1. In article conveying means, apparatus that transfers articles from one location to another by means of a moveable perforated belt that is positioned with its upper surface juxtaposed to the under-surface of a vacuum chamber having an apertured bottom, with said articles suspended from the underside of said belt through operation of vacuum from said vacuum chamber acting thereon via said apertures and a multiplicity of performations in said belt, wherein the improvement comprises a flat plate that has a layer of compressible material affixed to its underside, which plate is in parallel planar relationship to the top of the apertured bottom of said vacuum chamber, and is moveable vertically downward to such an extent that said compressible material is compressed against the top surface of said bottom and is moveable vertically upward by a distance such that said compressible material is in closed spaced-apart relationship to the top of said bottom, motion means interconnected with said plate to cause it to move vertically upward and downward, detection means for detecting when one among said articles suspended from said belt has been moved by said belt to a position directly beneath said plate and for causing said motion means thereon to actuate and cause to move said plate vertically downward until said compressible material impinges upon the top of said apertured bottom and is compressed between it and said plate to seal off the apertures in the region of said plate from the vacuum in said box and to introduce a slight positive pressure into said apertures by the piston effect of said compressible material being at least partially thrust into said apertures, and for causing said motion means thereafter to move said plate vertically upward until said compressible material is in closely spaced-apart relationship to said top of said apertured bottom.

2. The apparatus described in claim 1 wherein said motion means comprises a fluid actuated piston mechanically interconnected with said plate.

3. The apparatus described in claim 2 in combination with stacker means positioned directly beneath said plate, said box bottom, and said belt, which includes a surface to receive the first among a series of articles released from said belt by operation of said apparatus when said surface is at a pre-determined distance beneath said belt and which is adapted to cause said surface to move downward in successive incremental steps, each one of which steps follows an article being so released from said belt and is substantially equal in downward displacement to the distances between said surface and said belt when said first of said articles is released.

4. The apparatus described in claim 2 in combination with stacker means positioned directly beneath said plate, said box bottom, and said belt, which includes a surface to receive the first among a series of articles released from said belt by operation of said apparatus when said surface is at a pre-determinated distance beneath said belt and which is adapted to cause said surface to move downward in successive incremental steps, each one of which steps follows an article being so released from said belt and is substantially equal in downward displacement to the distance between said surface and said belt when said first of said articles is released, wherein said stacker means includes conveyor means to carry away the stack of articles when a pre-determined number has been reached in the stack.

5. The apparatus described in claim 1 in combination with stacker means positioned directly beneath said plate, said box bottom, and said belt, which includes a surface to receive the first among a series of articles released from said belt by operation of said apparatus when said surface is at a pre-determined distance beneath said belt and which is adapted to cause said surface to move downward in successive incremental steps, each one of which steps follows an article being so released from said belt and is substantially equal in downward displacement to the distance between said surface and said belt when said first of said articles is released.

6. The apparatus described in claim 1 in combination with stacker means positioned directly beneath said plate, said box bottom, and said belt, which includes a surface to receive the first among a series of articles released from said belt by operation of said apparatus when said surface is at a pre-determined distance beneath said belt and which is adapted to cause said surface to move downward in successive incremental steps, each one of which steps follows an article being so released from said belt and is substantially equal in downward displacement to the distance between said surface and said belt when said first of said articles is released, wherein said stacker means includes conveyor means to carry away the stack of articles when a pre-determined number has been reached in the stack.

* * * * *